United States Patent [19]
Nicholson et al.

[11] Patent Number: 6,093,906
[45] Date of Patent: Jul. 25, 2000

[54] METHOD OF PIPE WELDING

[75] Inventors: Peter Nicholson; Elliott K. Stava, both of Sagamore Hills, Ohio

[73] Assignee: Lincoln Global, Inc., Cleveland, Ohio

[21] Appl. No.: 09/359,377

[22] Filed: Jul. 23, 1999

[51] Int. Cl.[7] .................................................... B23K 9/09
[52] U.S. Cl. ............. 219/137 PS; 219/61; 219/137 WM
[58] Field of Search .................... 219/137 PS, 137 WM, 219/61, 130.51, 146.23

[56] References Cited

U.S. PATENT DOCUMENTS 5,676,857 10/1997 Parker .
5,742,029  4/1998 Stava et al. .
5,945,014  8/1999 Crockett et al. .................. 219/137 PS
5,961,863 10/1999 Stava ................................. 219/137 PS

*Primary Examiner*—Clifford C. Shaw
*Attorney, Agent, or Firm*—Vickers, Daniels & Young

[57] ABSTRACT

A method of welding the ends of two pipes at the open root between the spaced ends by an STT electric arc welder, which comprises: selecting a welding wire having 0.06–0.15% by weight carbon, 0.90–1.40% by weight manganese, and 0.45–0.75% by weight silicon, as well as phosphorous, copper, stainless steel alloys and sulfur; maintaining the sulfur at a given percentage level of the selected wire in the specific range of 0.015 to 0.035% by weight; and maintaining said phosphorous at a given percentage level of said selected wire in the specific range of less than about 0.015%.

19 Claims, 2 Drawing Sheets

METHOD OF PIPE WELDING

The present invention relates to a method of pipe welding and more particularly the method of using a particular welding wire with a specific power supply known in the pipe welding industry as the STT electric arc welder for welding the open root between pipe ends.

INCORPORATION BY REFERENCE

Over the last decade, the art of welding large plates together has adopted a short circuit electric arc welder for many specific welding applications. This welder sold by The Lincoln Electric Company of Cleveland, Ohio under the trademark STT is disclosed in Stava U.S. Pat. No. 5,742,029 for use in a specific wallpapering application. The unique short circuit electric arc welder is now the power supply of choice for electric arc welding of the spaced ends of pipe sections when laying pipe lines in the field. The implementation of a pipe welding method utilizing the unique short circuit welder is disclosed in Parker U.S. Pat. No. 5,676,857. Since these two patents and the material disclosed therein define the STT welder by The Lincoln Electric Company and its application to welding heavy plates, such as pipes, the patents are incorporated by reference herein as background information so that this known technology need not be repeated. Certain concepts regarding the use of a cored electrode and reverse polarity welding by the STT welder is disclosed in a copending application by Elliott K. Stava, Ser. No. 200,594 filed Nov. 27, 199, pending. This prior copending application is incorporated by reference herein as background information and for technology which also need not be repeated to understand the present invention.

BACKGROUND OF INVENTION

When pipe welding in the field, the joint between the ends of pipe sections is essentially the same as a joint between two heavy plates, except the pipe joint to be welded includes an open root where the ends of the pipe are spaced slightly. This open root is a gap normally created by bringing the two pipe sections into abutting relationship, followed by a withdrawal of a selected amount to define the minimum open root in the joint. It is essential that this open root be welded together with a quality weld throughout the total thickness of the bottom area of the pipe joint; however, when laying the first bead in the open root, it is also necessary that the molten weld metal does not protrude inwardly of the pipe section to any substantial distance. The pipe must be clear so that a pig and other cylindrical devices can move through the pipe section without encountering inwardly protruding weld metal created during the open root first welding. As another consideration, the heat of the open root weld cannot be too high causing metal shrinkage and, thus, draw back into the gap forming the open root. To accomplish a quality pipe open root weld, without substantial inward protrusion of molten metal or metal draw back, a short circuit arc welding method of the type made possible by use of an STT electric arc welder has been adopted. This pipe welding process controls the initial welding pass of the pipe welding procedure to fill the open root. Although this type of welding process is extremely advantageous, a substantial amount of development work has been required to select the welding wire to be used during the short circuit welding process. It has been found that a cored electrode has substantial advantages when used with an STT electric arc welder in welding the joint between pipe sections; however, the open root pass weld bead presents unique welding challenges. It has been found that the root pass weld bead is best accomplished by using a solid wire with the characteristics of the ANSI-AWS A 5. 1895 solid welding wire. This type of welding wire is used with a shielded gas and has the following specification.

TABLE I

|  | Percentage |
| --- | --- |
| Carbon | .06–.15 |
| Manganese | .90–1.40 |
| Silicon | .45–.75 |
| Phosphorous | 0–.025 |
| Sulfur | 0–.035 |
| Copper | 0–.50 |
| Ni/Cr/Mo/V | 0–.50 |

This standard gas shielded welding wire has been selected as a welding wire which provides a good appearance and allows the advantages of the STT electric arc welder during the open root welding pass. Although the weld bead appearance is usually acceptable with standard solid wire, a substantial improvement in bead appearance is obtained on the top and bottom of the bead by using the present invention.

THE INVENTION

After substantial experimentation and costly investigation it has been found that a quality weld is produced consistently with an excellent appearance and highest travel speed because of better flow characteristics when phosphorous is maintained at only a trace and sulfur is maintained at a high level in the specific range of over 0.015% by weight and less than 0.035% by weight in the welding wire. By controlling and maintaining these limits for phosphorous and sulfur in the welding wire, a consistent good appearing open root weld is accomplished. Consequently, in accordance with the present invention there is provided a method of welding the ends of two pipes at the gap or open root between the spaced ends. This method comprises selecting a welding wire having 0.06–15% by weight of carbon, 0.90–1.40% by weight manganese, and 0.45–0.75% by weight silicon. In addition, the wire includes phosphorous, copper, stainless steel alloys and sulfur. The method involves maintaining the sulfur at a given percentage level of the selected wire in the specific range of 0.015–0.35% by weight and maintaining the phosphorous at a given percentage level of the selected wire in the specific range of less than about 0.015%. Indeed, the phosphorous is normally at a trace or tramp level of 0.006–0.008% by weight of the welding wire. In this invention, the selected welding wire is advanced at a given wire feed rate toward the open root between the spaced pipe ends to weld the sections together by filling the open root in a first weld pass, creating a welding current with a controlled wave form, which wave form includes a succession of welding cycles each having a short circuit portion and a plasma arc portion with the plasma arc portion including in sequence a plasma boost segment, a tailout segment and a background current segment. The welding wire is moved along the open root as the welding current is passed through the wire to melt the wire and transfer the wire by surface tension transfer to the pipe ends thereby filling the open root. The current wave form is formed by a rapid succession of current pulses created by an oscillator at a rate of at least 18 kHz and with a width controlled by a pulse width modulator. By using the invention, a high quality weld bead is deposited in the open root during the first pass of a welding process. Thereafter, another welding wire, such as a flux cored wire can be used to fill the remainder of the joint. Thus, the root pass is filled by an optimized weld procedure and the remaining joint is filled by a procedure tailored to high deposition demands.

The primary object of the present invention is the provision of a method of filling the open root in a pipe welding process, which method employs a specific type of short circuit welding process and a solid welding wire having certain maintained levels of phosphorous and sulfur.

Yet another object of the present invention is the provision of the present invention is the provision of a method as defined above, which method consistently produces a quality open root weld in a pipe welding procedure.

These and other objects and advantages will become apparent from the following description taken together with the accompanying drawings.

PREFERRED EMBODIMENT

Figure 1:
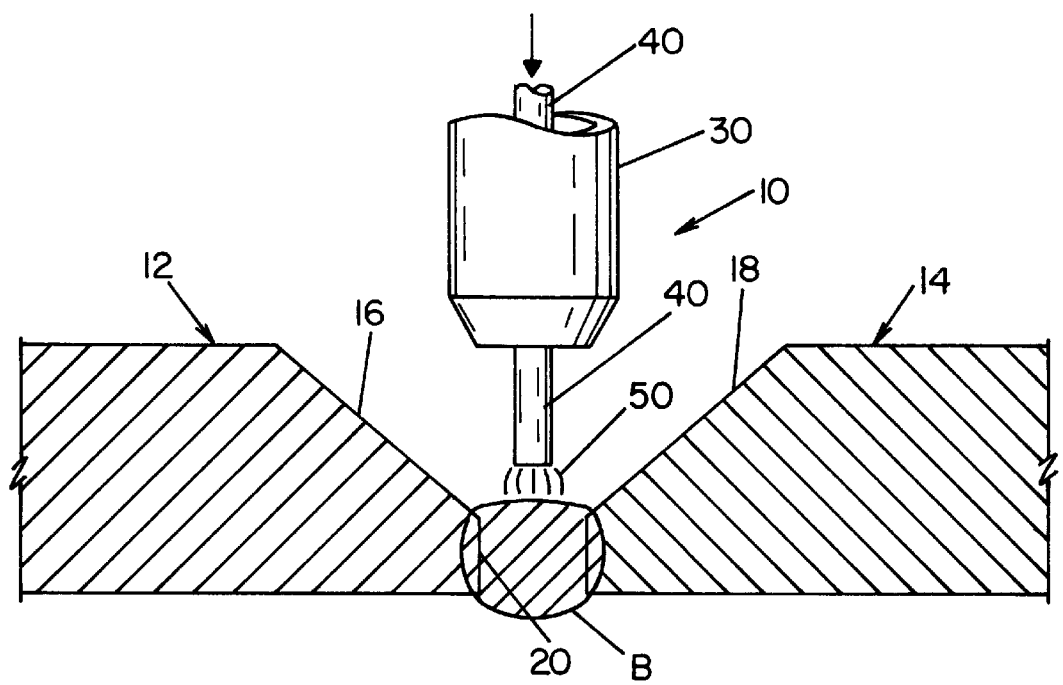
FIG. 1 is an enlarged partial view showing a welding wire passing through a torch movable along an open root between two pipe sections.
Figure 2:
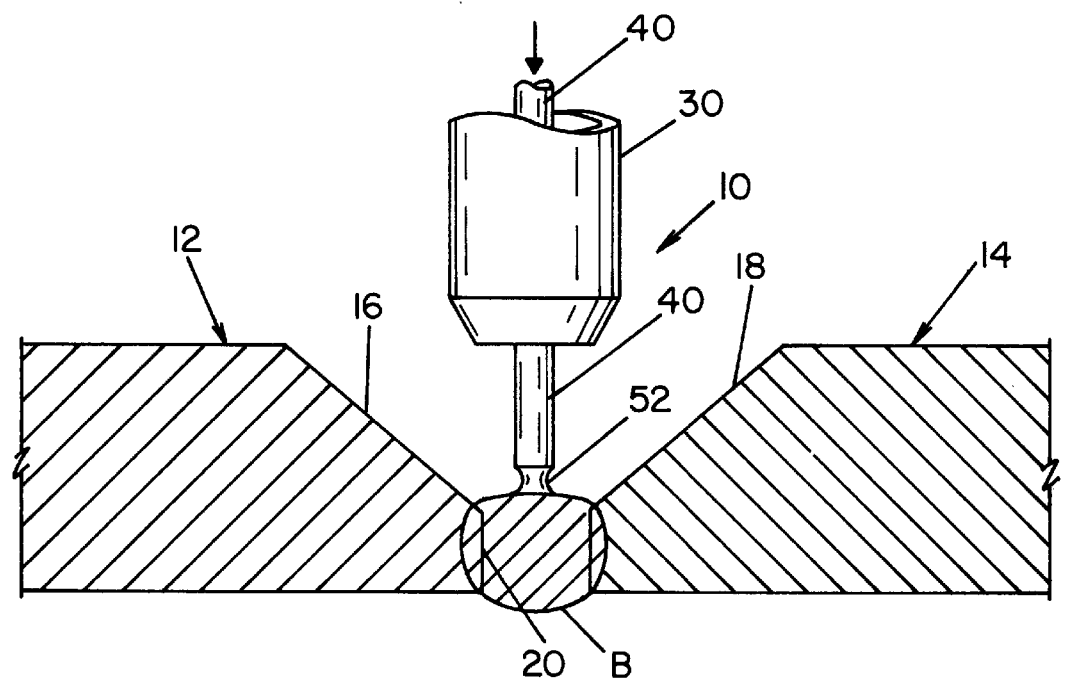
FIG. 2 is a view similar to FIG. 1 with the welding wire in the short circuit, metal transfer condition.

The present invention relates to a method of welding the ends of two pipes at the open root between the ends by using a special welding wire in combination with the STT welding procedure. In FIGS. 1 and 2 the pipe welding operation 10 is used to weld the pipe sections 12, 14 having a gap or open root 20 defined by tapered ends 16, 18, which ends are spaced apart in accordance with standard practice. The invention relates to the laying or deposition of the first weld bead B in the open root 20 by moving torch 30 around the pipe sections 12, 14 while the torch follows a path determined by the joint including root pass 20 at the bottom. In accordance with the invention, a wire 40 is fed at a selected rate through torch 30 toward root pass 20 while welding current is passed through the welding wire. The welding current creates an arc 50 as shown in FIG. 1 to melt the end of the advancing wire 40. As the wire is converted to a molten ball and moved toward bead B, a short circuit condition 52 is created as shown in FIG. 2. This condition causes a transfer of molten metal from wire 40 to bead B. By moving torch 30 around open root 20, this alternate arcing condition and short circuit, metal transfer condition is continued. Welding wire 40 has a special composition. In accordance with the invention, it includes 0.06–0.15% by weight of carbon, 0.90–1.40% by weight manganese, and 0.45–0.57% by weight silicon. In addition, the wire includes phosphorous, copper, stainless steel alloys, such as nickel, chrome, molybdenum and vanadium, and sulfur. In accordance with the present invention, wire 40 has a sulfur percentage level maintained in the specific range of 0.015–0.035% by weight. In a like manner, a trace amount of phosphorous is maintained in electrode 40. This trace amount is in the general range of 0.006–0.008% by weight and in accordance with the invention is always maintained at a level of less than 0.015%. By selecting and maintaining the composition of electrode 40, the advantages set forth in the introductory portion of this disclosure are realized. In addition, the STT welding process used in combination with the specifically tailored electrode or welding wire is critical. This welding process used in accordance with the present invention is illustrated in FIGS. 3 and 4.

Figure 3:
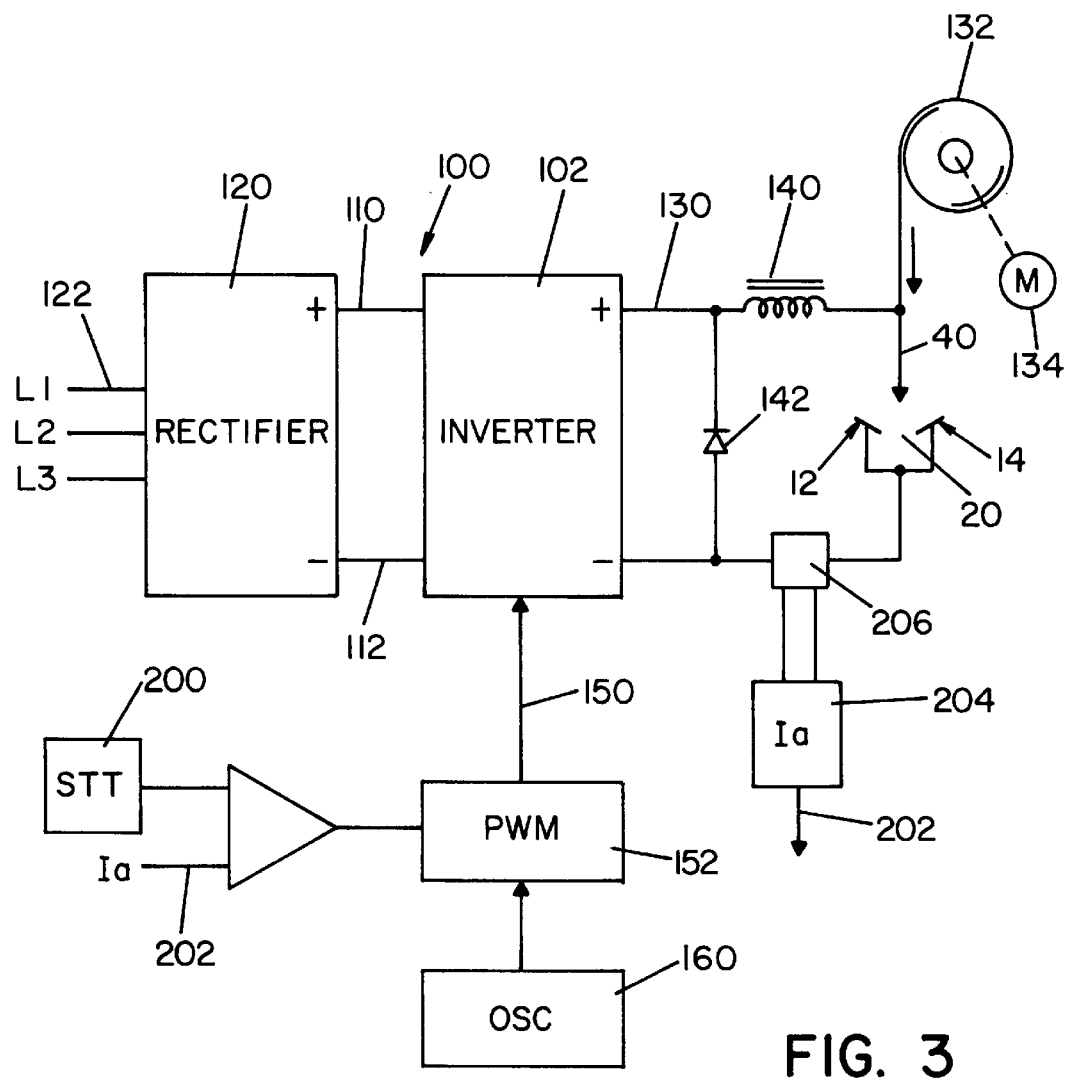
FIG. 3 is a simplified diagram of an STT welder used in the invention.
Figure 4:
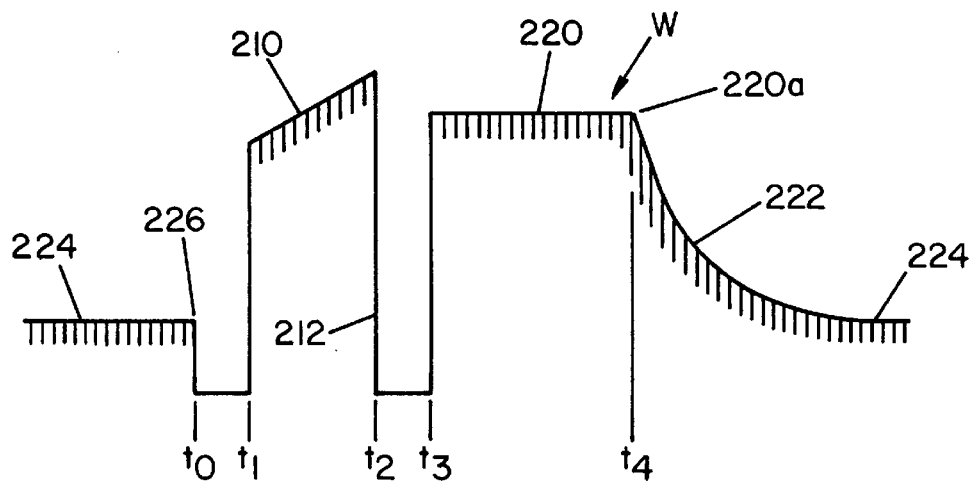
FIG. 4 is a current wave form of the type used in practicing the present invention.

Referring now to FIGS. 3 and 4, the waveform W shown in FIG. 4 is the STT waveform created by the STT welder 100. This welder uses either a down chopper or the illustrated high speed, switching inverter 102 with a DC input link having a positive terminal 110 and a negative terminal 112. In the field, the STT welder or power supply is normally driven by a motor generator; however, for simplicity, the input is illustrated as a rectifier 120 with a three phase input power supply 122. The output 130 of STT welder is used to melt and deposit electrode or welding wire 40 from a supply reel 132 advancing toward the open root 20 between pipe sections 12, 14 by an electric motor 134 driven at a selected speed to control the wire speed rate. In accordance with standard STT practice, a relatively small inductor 140 is provided in output 130 with a freewheeling diode 142 for the purposes of stabilizing the output welding procedure to follow the waveform. Wave form W, as shown in FIG. 4, is controlled by the voltage on control line 150 of inverter 102. This input or control line has a voltage determined by the output of pulse width modulator 152 operated at a rate exceeding 18 kHz by oscillator 160. Preferably the rate of pulses on line 150 is substantially greater than 20 kHz. Thus, inverter 102 outputs a rapid succession of current pulses created by oscillator 160 at a very high rate. Pulse width modulator 152 determines the width of each current pulse from inverter 120 to output 130. In accordance with standard STT practice, wave shape W is determined by control circuit 200. This standard practice is shown generally in FIG. 10 of Stava U.S. Pat. No. 5,742,029. The wave shape control circuit 200 has an output with a voltage that is compared to the voltage on line 202. This feedback voltage is representative of the arc current through wire 40. A voltage representing arc voltage is generated by current sensor 204 receiving current information from shunt 206. Waveform W as used in the present invention is a single welding cycle repeated successively as wire 40 is melted and deposited between pipe sections 12, 14. Waveform W, in accordance with STT technology includes a short circuit portion including a metal transfer short circuit pulse 210 where the current is dropped when the metal being transferred is electrically necked down and then ruptured. After the rupture or "fuse" waveform W transitions into an arc or plasma portion, comprising a plasma boost 220 having a controlled maximum current 220a, a tailout portion 222 and a background portion 224. Background current is provided for sustaining the arc until the next short circuit at point 226 when the molten metal ball on the wire 40 shorts against pipe sections 12, 14 or against the bead B filling root pass 20.

In accordance with a limited aspect of the present invention, the composition of welding wire 40 includes less than 0.50% by weight copper and less than 0.50% of the stainless steel alloys. After the open root is closed by bead B, the welding method shifts to a rapid filling of the remainder of the joint. This is accomplished either by using a solid wire with gas or, preferably, by using a cored welding wire with a flux so shield gas is not necessary. Preferably the STT welder or power supply is also used in the joint filling operation where a number of high deposition passes are made around the pipe.

Having thus defined the invention, the following is claimed:

1. A method of welding the ends of two pipes at the open root between said spaced ends, said method comprising:

(a) selecting a welding wire having 0.06–0.15% by weight carbon, 0.90–1.40% by weight manganese, and 0.45–0.75% by weight silicon, as well as phosphorous, copper, stainless steel alloys and sulfur;

(b) maintaining said sulfur at a given percentage level of said selected wire in the specific range of 0.015 to 0.035% by weight;

(c) maintaining said phosphorous at a given percentage level of said selected wire in the specific range of less than about 0.015%;

(d) advancing said selected welding wire at a given wire feed rate toward said open root between two pipe ends to weld said pipe ends together by filing said open root in a first weld pass;

(e) creating a welding current with a controlled waveform, said waveform including a succession of welding cycles each having a short circuit portion and a plasma arc portion with the plasma arc portion including in sequence a plasma boost segment, a tailout segment and a background current segment;

(f) moving said welding wire along said open root as said welding current is passed through said wire to melt the wire and transfer the melted wire by surface tension transfer to said pipe ends in said open root; and, (g) forming said current waveform by a rapid succession of current pulses created by an oscillator at a rate of at least 18 kHz and with a width controlled by a pulse width modulator.

2. A method as defined in claim 1 wherein said given percentage level of phosphorous is in the range of about 0.006–0.008% by weight.

3. A method as defined in claim 2 wherein said given percentage level of sulfur is in the range of 0.025–0.035% by weight.

4. A method as defined in claim 2 wherein said stainless steel alloys are at a given percentage level of less than 0.50% by weight.

5. A method as defined in claim 4 wherein said stainless steel alloys are selected from the group consisting of nickel, chromium, molybdenum, vanadium and mixtures thereof.

6. A method as defined in claim 1 wherein said given percentage level of sulfur is in the range of 0.025–0.035% by weight.

7. A method as defined in claim 6 wherein said copper is at a given percentage level of less than 0.50% by weight.

8. A method as defined in claim 4 wherein said stainless steel alloys are at a given percentage level of less than 0.50% by weight.

9. A method as defined in claim 8 wherein said stainless steel alloys are selected from the group consisting of nickel, chromium, molybdenum, vanadium and mixtures thereof.

10. A method as defined in claim 1 wherein said copper is at a given percentage level of less than 0.50% by weight.

11. A method as defined in claim 10 wherein said stainless steel alloys are at a given percentage level of less than 0.50% by weight.

12. A method as defined in claim 11 wherein said stainless steel alloys are selected from the group consisting of nickel, chromium, molybdenum, vanadium and mixtures thereof.

13. A method as defined in claim 1 wherein said stainless steel alloys are at a given percentage level of less than 0.50% by weight.

14. A method as defined in claim 13 wherein said stainless steel alloys are selected from the group consisting of nickel, chromium, molybdenum, vanadium and mixtures thereof.

15. A method as defined in claim 1 wherein said stainless steel alloys are selected from the group consisting of nickel, chromium, molybdenum, vanadium and mixtures thereof.

16. A method as defined in claim 1 including filling the joint above said metal in said open root after said first weld pass by a filler welding wire.

17. A method as defined in claim 16 wherein said filler welding wire is different from said selected welding wire.

18. A method as defined in claim 17 wherein said filler wire is a cored welding wire.

19. A method as defined in claim 16 wherein said filler wire is a cored welding wire.

* * * * *

UNITED STATES PATENT AND TRADEMARK OFFICE
CERTIFICATE OF CORRECTION

PATENT NO. : 6,093,906  
DATED : July 25, 2000  
INVENTOR(S) : Peter Nicholson and Elliott K. Stava It is certified that error appears in the above-identified patent and that said Letters Patent is hereby corrected as shown below:

Column 3,  
Line 52, delete "0.57%" and substitute therefor -- 0.75% --.

Signed and Sealed this

Eighth Day of January, 2002

Attest:

JAMES E. ROGAN  
*Attesting Officer*     *Director of the United States Patent and Trademark Office*